United States Patent [19] [11] 3,753,500
Voegeli [45] Aug. 21, 1973

[54] INTEGRAL IN-LINE FILTER

[75] Inventor: Douglas W. Voegeli, Saint Paul, Minn.

[73] Assignee: Minnesota Mining and Manufacturing Company, Saint Paul, Minn.

[22] Filed: Mar. 20, 1970

[21] Appl. No.: 235,916

[52] U.S. Cl............ 210/446, 55/DIG. 5, 210/496, 210/506, 210/510
[51] Int. Cl.............................................. B01d 27/00
[58] Field of Search.............. 55/482, 486, DIG. 5; 210/446, 496, 497, 506, 510

[56] References Cited
UNITED STATES PATENTS
2,068,858  1/1937   Jones.................................. 55/482
2,563,354  9/1951   Morey............................ 210/510 X
2,915,187  12/1959  Jaffe................................... 210/446
3,175,935  3/1965   Vanstrum................... 106/288 B X
3,240,346  3/1966   Callahan, Jr. et al........... 210/496 X
3,357,564  12/1967  Medford, Jr. et al........... 210/496 X
3,538,020  11/1970  Heskett et al................... 210/510 X Primary Examiner—Samih W. Zaharna
Assistant Examiner—Richard W. Burks
Attorney—Kinney, Alexander, Sell, Steldt & Delahunt

[57] ABSTRACT

An integral, composite filtration structure is formed in situ of thermosetting resin-coated particles bonded to each other and to the inner walls of a tubular article at the contiguous surface of said article and the resin-coated particles.

7 Claims, 4 Drawing Figures

PATENTED AUG 21 1973       3,753,500

INTEGRAL IN-LINE FILTER

This invention relates to filter bodies and a method of manufacturing them. In another aspect, it relates to an in-line filter. In a further aspect, this invention relates to a method for forming an in-line filter.

In-line filters useful for filtering fluids are well-known in the art. The prior art filters all possess the common feature of requiring a means such as gaskets or brazing compounds for sealing the filter element within the casing or housing which holds the filter element. For example, U.S. Pat. No. 3,240,346 discloses a removable filter element which is press fitted within a housing to provide an in-line filter. When a filter element is press fitted, costly precision machining of it and the filter housing is required to achieve a fluid-tight fit.

U.S. Pat. No. 2,068,858 teaches the use of a soft malleable gasket material for sealing the filter within associated fittings. There are disadvantages often associated with gaskets, such as loss of filter area due to the presence of the gasket material and leakage problems caused by non-parallel surfaces, inadequate sealing pressures on the gasket, or the loss of resiliency of the gasketing material caused by aging during use.

Heat fusion as a means for sealing a filter element in a metal fitting is known in the art. U.S. Pat. No. 2,915,187 discloses the use of a heat fusion process to seal a metal filter in a housing, forming a filter fitting. The major disadvantages encountered in any heat fusion process are high cost per article and limitation on the geometric configurations of the filter body. Other difficulties encountered when using heat fusion processes are a tendency for the liquid metal to wick into the porous filter material and the creation of dissimilar metal interface at the contiguous edge of the filter and fitting which may result in accelerated corrosion due to galvanic action.

It is the object of this invention to provide a low-cost, corrosion resistant in-line filter which can be made at low temperatures, in various configurations, and formed in housing or casings with diverse internal geometric configurations, in such a manner that the resulting filtration structure is an integral filter assembly. It is also an object of this invention to provide a leak-proof in-line filter assembly without the use of additional sealing gaskets or expensive machining operations.

Briefly, the in-line filters of this invention employ particulate material, granules, or beads such as glass beads, coated with a nontacky, powdered thermo-setting resin, such as that disclosed in U.S. Pat. No. 3,175,935. The free-flowing coated beads are poured into a suitable filter housing to dispose a mass of said coated beads at a desired locus in the said housing, and the so-disposed coated beads are consolidated therein to form a desired shaped body, the shaped body then being heated to cure the resin in situ within the housing. Heating causes the contiguous beads to become bonded together in a cured thermoset resin matrix, thereby forming a solid, consolidated composite porous body which is also bonded to the contiguous wall of the housing in which it is disposed.

In the accompanying drawing, FIG. 1 is a cross-sectional view of a fitting having disposed therein a porous filter element in the form of a cylinder integrally bonded to the inner wall of said fitting;

Figure 1:
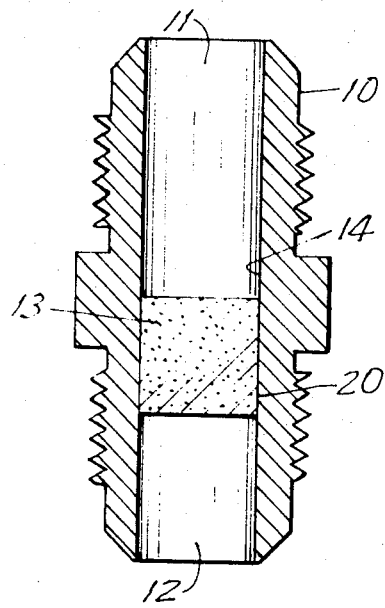

Referring to the accompanying drawing, FIG. 1 shows an integral in-line filter comprising a male flare-to-flare fitting 10, made of brass, for example, with an inlet 11 and an outlet 12 having disposed therein between a composite porous filter body 13 formed of cured resin-coated granules, for example, glass beads, said filter body being bonded to the inner wall 14 of the said fitting at the contiguous interface 20 between it and the adjacent periphery of the filter body.

Figure 2:
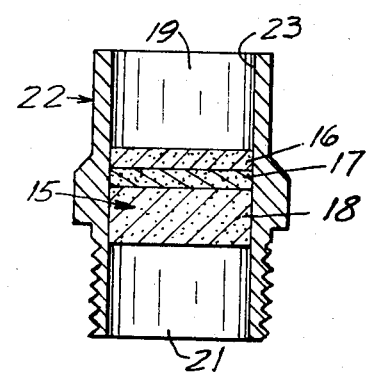
FIG. 2 is a cross-sectional view of a sweat fitting having disposed therein a laminated porous filter body comprising several disk-like filter elements, said elements having different micronic ratings and bonded to each other and the inner walls of said fitting.

In FIG. 2, an integral in-line filter is shown comprising a laminated filter body 15 having porous layers or disk-like filter 16, 17, and 18, each layer comprising cured resin-coated granules, such as glass beads, with a different micronic rating, the filter body being disposed between the inlet 19 and the outlet 21 of the sweat fitting 22. Layers 16, 17 and 18 are bonded at the interface between each other and to the inner wall 23 of the fitting 22 by curing the resin coating applied to each bead. Because of the conformability of the coated particulate material before the resin is cured, the filter of this invention can be formed in sweat fittings which have changes in the internal dimensions, such as a 45° shoulder.

Figure 3:
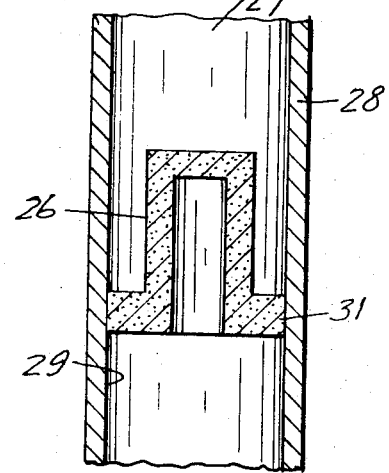
FIG. 3 is a cross-sectional view of a tube having disposed therein a cup-shaped, porous filter element having an extended filter surface.

It is often desirable to have an extended surface filter formed as part of a filtration structure. FIG. 3 represents one such configuration, comprising a cup-shaped filter body 26 of cured resin-coated granules disposed within the passage 27 of a tubular housing 28, said body 26 being integrally bonded to the inner wall 29 of said tubular housing at the interface 31 of the filter body and the inner wall of said housing.

Figure 4:
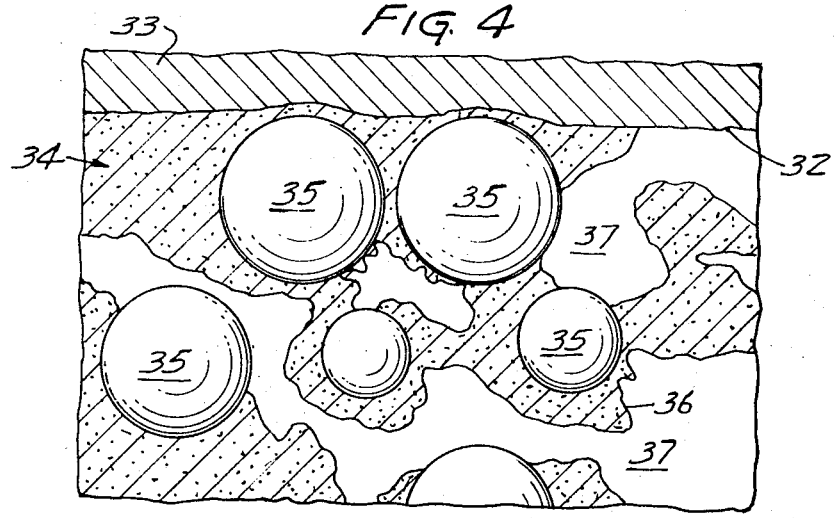
FIG. 4 is a pen-and-ink drawings of a photomicrograph showing the contiguous filter-housing interface of a filter made from 540 micron coated beads.

FIG. 4 shows an enlarged section of any of the in-line filters of FIGS. 1–3 through the interface area at the locus of the bond formed between the filter element and filter housing. Reference member 32 designates an inner wall of a housing 33 and 34 designates the body of a filter formed in situ, wherein glass beads 35, having a diameter of approximately 540 microns, are integrally bonded to each other by a cured resin matrix 36 and to the inner wall 32 by said resin matrix, with interconnected void areas 37 disposed with the glass bead-resin composite.

The in-line filter of this invention comprises a porous composite body of non-friable particulate material which has been firmly bonded together and firmly bonded to the filter casing by a cured matrix of thermo-setting resin. Many types of particulate material, such as glass, ceramics, and metal, in the form of granules or beads, or the like, can be bonded together by use of various thermosetting resins. The preferred shape for the particulate material is spherical since spherical particles result in a free-flowing material which conforms readily to complex internal geometries, e.g. trapezoid, pentagontal, or hexagonal, allowing a filter to be made in situ even where the fittings have internal configurations which are difficult to seal with gaskets.

The preferred starting material for the composite filter body consists of spherical glass beads which have been coated with a tacky resin and overcoated with a nontacky thermosetting resin in accordance with U.S. Pat. No. 3,175,935. The glass beads when so-coated comprise a flowable material having particulate cores adherently coated with a solid, nontacky thermoadhesive. Glass beads of 30–900 micron diameter preferably can be made with uniform size and spheroidal in shape allowing the formation of filters having uniform porosity and various micronic ratings. The porous bodies with higher micronic ratings are made with the larger diameter glass beads and vice versa.

The thermosetting resin must have a cure temperature low enough to prevent thermal degradation of the supporting structure when the in situ curing process is carried out. In the case of metals, cure temperatures would be no problem since the melting point of most metals is considerably in excess of the cure temperature of commonly available thermosetting resins and the metals would not undergo any changes in physical properties due to thermal annealing at the cure temperature of most resins.

In the case of glass or plastic filter housing, e.g., polyethylene, polytetrafluoroethylene and glass, the acceptable maximum cure temperature for the thermosetting resin used to bind the particles forming the integral porous filter body will be much lower than for thermosetting resins used to form filter bodies in metal housing. Especially in the case of plastic housings, the thermosetting resin to be chosen is one which cures at a temperature below the softening point of the plastic housing to prevent deformation of the housing during the application of heat to effect cure. The choice of resin will also be influenced by the fluid which is to be filtered. The resin chosen must be one which is not dissolved nor degraded by the fluid being filtered. If said fluid dissolves the resin matrix, the porous body would disintegrate in time.

Representative thermosetting resins, which can be used to coat the particulate material used in this invention include epoxides (such as those based on epichlorohydrin and bis-phenol A, epoxy novolac resins and cycloaliphatic epoxy resins), polyesters, and phenolics. Said U.S. Pat. No. 3,175,935 discloses particularly useful epoxy resins for this purpose. Reference is also made to a compilation of resins, useful in the practice of this invention, in Plastics Engineering Handbook, page 8–39, Reinhold Publishing Corp., 3 Ed. (1960).

The filtration housing or casing within which the filter body is formed in situ can be made from a large number of materials suitable for use for filtering various fluids. Where the filter is used to filter liquids, such as solvents, hydraulic fluids, and the like, the filter housing can be formed in brass, bronze, or copper fittings having diverse shapes, said fittings being well known in the art. In a high pressure system where hydraulic fluid is to be filtered, the integral filtration structure can be formed in various high pressure fittings of high strength materials, e.g., cast iron or seamless tubing. Where it is necessary for the filtration structure to withstand the action of chemicals or corrosive liquids, the porous filter element can be formed in a tubular article made of corrosion resistant material, e.g., stainless steel or glass tubing, which is resistant to attack by the corrosive chemicals being filtered.

Whichever material is used as the filter housing for the porous filter element, the material must be wet by the thermosetting resin used to coat the glass beads or other particles. In general, thermosetting resins will wet a material if the surface free energy of said material is higher than the surface free energy of the thermosetting resin, and at some stage of process will be in a flow state. If the material in which the filter element body is formed is not wet by the thermosetting resin, the resulting filter body will not be firmly and integrally bonded to the inner walls of the supporting filter housing and the resulting filter will lack strength and durability. Also, the wetting of the filtration housing by the thermosetting resin allows the resin to cure and form a liquid impenetrable seal at the contiguous surfaces of the formed porous body and the inner walls of the filtration housing. This problem can be minimized or even eliminated in some cases by using intermediate coating treatments to prepare the inner wall of the filter housings prior to formation of the filter body in the filter housing. The problem and expense of separate gaskets or close tolerance fittings is eliminated by the use of a filter body formed in situ and bonded to the filtration housing.

After the particulate material is coated with a suitable resin which will wet the surface of the chosen supporting filtration housing structure, e.g., copper, brass, glass, and which cures at a temperature lower than the thermal degradation temperature of the supporting structure, a removable support member or dam is placed within the chosen filter case or housing to support the flowable, resin-coated particulate mixture at the desired filtering locus. The dam can be metal, plastic, or a pressurizable membrane, but in any case, it must conform to or fit the internal geometry of the filter housing.

A metered amount of the resin-coated particulate mixture is introduced into the internal cavity of the housing and held in the proper position by said dam member. A ram or punch of metal, plastic, pressurizable membrane, or the like, also conforming to the internal geometry of the housing, is placed over the mass of coated particulate material on the dam and a pressure applied by the ram to the coated particulate material to consolidate the mass into a desired shape. The desirable pressure to be used will be a function of the strength requirements of the filter element to be formed. It has been found that, depending upon the complexity of the internal geometry of the filtration housing, pressures from 5 to 15,000 pounds per square inch when applied to the uncured resin-coated beads are sufficient to give filter elements which are integrally bonded at their periphery to the contiguous edges of the supporting housing and which are uniform in porosity. Also, it has been found that filters of greater uniformity and porosity can be formed by pressing at slightly elevated temperatures (in the range of approximately 35° to 95° C.) and through the use of a small amount of a lubricant applied to the beads, e.g. approximately ½ percent by weight of glycerin based on the weight of the coated particles.

The resulting assembly with the consolidated coated beads formed in the housing cavity can then be transferred to a warm air oven and the resin cured using the appropriate time-temperature cycle for the chosen resin. With many commercially available epoxy resins, a cure cycle of ½ to 1 hour at about 190° C. has been found satisfactory to completely cure the resin and form an integrally bonded structure.

Where the consolidated coated bead shape, such as a disk, has a relatively large cross-sectional area and is relatively thin, it is desirable to support said consolidated shape during the cure cycle. The use of a metal support or a layer of coarse ceramic material, e.g. alumina or sand or a leachable material, e.g. sodium chloride, held beneath the consolidate shape will give acceptable support to keep the consolidated shape from sagging during curing. When using a metal supporting member, said member can be coated with a suitable mold release agent, e.g. silicone.

During the cure cycle, the resin softens, flows and cures around the glass beads and wets, flows the cures onto the walls of the housing. The resulting in-line filter assembly can then be removed from the oven and cooled to room temperature.

Advantages of this invention are further illustrated by the following examples in which all parts are by weight unless otherwise stated. The particular amounts and materials recited in these examples, as well as other conditions and details should not be construed to limit the scope of this invention.

The integral in-line filters formed in these examples have been assigned an approximate micronic rating. The rating was derived by testing filters made from similar coated beads and under similar molding conditions. The test used to determine the bubble point and thereby the micronic rating was ASTM E128-61.

EXAMPLE 1

Spherical glass beads of 100 mesh (149 micron diameter) were coated with "Scotchkote" 112 thermosetting epoxy resin, to the extent of about 16 grams of resin per 100 grams of glass beads. A ⅜ in. diameter steel rod was inserted as a dam into one end of a flare-to-flare brass fitting, having an internal diameter of ⅜ in., the rod extending into the fitting to a point midway between its ends. Approximately 1.25 grams of resin-coated glass beads were introduced into the other or open end of the brass fitting and a second ⅜ in. steel rod was inserted as a ram into open end of the fitting.

Using a single action hydraulic press, a pressure of 200 pounds was applied to the ram to consolidate the epoxy resin coated glass beads in the form of a disk. The steel rods were withdrawn with the consolidated body of coated beads disposed within the fitting in the form of a disk at the desired filtration locus and the assembly was transferred to a warm air oven and cured at about 190° C. for ½ hour, forming an in-line filter shown in FIG. 1 comprising a porous, composite filter body integrally bonded in the brass fitting.

The in-line filter was connected to a compressed air line. A pressure drop of 23.5 cm. of Hg across the filter body was measured at an air flow rate of 15 scfh with a pressure gage on the upstream side of the filter. The filter's bubble point when tested according to ASTM E128-61 was found to have a micronic rating of 50 microns. The strength of the bond between the porous filter element and the brass fitting was determined by measuring the force necessary to eject the filter element from the housing with a ⅜ in. diameter rod. A force of over 1000 pounds was required to eject the filter element from the brass housing.

EXAMPLE 2

A laminated, multiple porosity, in-line filter assembly was fabricated in a copper sweat fitting with a nominal internal diameter of one inch. The resulting filter assembly had a configuration similar to that shown in FIG. 2 of the drawings, said filter being useful to filter successively finer particles from the fluid being filtered without the filter being filled by a large number of particles caught or retained on one filter surface.

To form the filter, a steel plunger, which conformed to the internal dimensions of the sweat fitting, was inserted into one end of the fitting to about the midpoint of said fitting. About 5.0 grams of 24 mesh, about 2.5 grams of 65 mesh, and about 2.5 grams of 180 mesh resin-coated, soda lime silica glass beads (all three sizes of bead having been coated as in Example 1), were successively poured into the open of the fitting and leveled in the internal cavity. A second steel plunger ram was inserted into the opposite end of the fitting, sealing the fitting, and a pressure of 14000 psi applied to the filter body in a single action hydraulic press. The steel plungers were withdrawn, and the assembly transferred to a warm air oven. The epoxy resin was cured at 190° C. for ½ hour. The resulting filter assembly consisted of a laminated filter body having three different micronic ratings of 227, 89, and 39, the laminae integrally bonded to each other and to the inside of the fitting.

EXAMPLE 3

A double laminated in-line filter assembly was fabricated in a copper sweat fitting using the technique of Example 2, said fitting having an internal diameter of one inch and a 45° shoulder. In this example, the filter comprised a 0.365 inch layer of 24 mesh epoxy-coated glass beads (710 micron) and a 0.295 inch layer of 33 mesh epoxy-coated glass beads (110 micron diameter). The resulting filter had a laminated structure with micronic ratings of 227 and 176. A load of 1250 pounds (1650 psi) was necessary to eject the filter element from the housing. The ejection pressure was exerted from the smaller diameter of the housing to avoid any mechanical advantages being contributed by the shoulder of said housing and thus determined the strength of the bond between the filter element and housing.

EXAMPLE 4

Spherical glass beads of 65 mesh (230 micron diameter) were coated with a solid epoxy of the diglycidyl ether of bisphenol A type, incorporating a curing system as described in U.S. Pat. No. 2,847,395, and commercially available as "Scotchkote" 112. The degree of coating amounted to 16 grams of resin per 100 grams of glass beads.

A flat cylindrical rod, formed of "Delrin" (a composite of tetrafluoroethylene fibers bonded by an acetyl resin), was inserted as a dam into a preheated (about 95° C.) thick-walled glass tube having an internal diameter of 1.125 inches. About 32 grams of the resin coated beads were introduced into the open end of the tube. A punch made of "Delrin" was inserted from the opposite end of the tube and a pressure of 250 pounds applied to the punch in a hydraulic press to consolidate the coated beads in the form of a disk.

The assembly was placed in a warm air oven at about 95° C. for 15 minutes. The punches were removed and the assembly heated at about 190° C. for ½ hour to cure the epoxy resin, thereby forming the bead-to-bead and bead-to-glass tube bond. A force of 800 pounds was required to eject the porous filter element having a micronic rating of 89 from the glass tube. This high level of performance was obtained without pretreatment of the glass tube to enhance the bead-to-tube bond.

EXAMPLE 5

Example 4 was repeated using resin coated beads of three different diameters to form a multiple porosity filter element. About 25 grams of 65 mesh beads, about 8 grams of 48 mesh beads, and about 8 grams of 24 mesh resin coated beads were successively introduced into the cavity of a glass tube and the coated glass beads consolidated and the resin cured as in Example 4. The resulting in-line filter was a multiple porosity laminate having micronic ratings of 89, 115, 227, similar to FIG. 2 formed in a glass tube.

EXAMPLE 6

"Delrin" punches were machined to provide complementary male and female members for use in forming an extended surface, cup-like filter element as shown in FIG. 3, in a copper sweat fitting having a nominal internal diameter of one inch. The male punch was inserted to act as a dam and 16 grams of 40 mesh (420 micron diameter) glass beads coated as in Example 4 were charged and consolidated, and the resin as in Example 4 was cured resulting in an integral in-line extended surface filter structure having a micronic rating of 138 and an effective filtration area three times that of a flat disk filter with the same diameter.

EXAMPLE 7

A rectangular steel casing having a rectangular configuration approximately 1⅛ in. by 2⅛ in. and two "Delrin" punches machined to fit the steel casing were preheated to 110° C. One punch was inserted as a dam into one end of the steel casing and about 32 grams of 40 mesh epoxy resin coated beads were charged into the open end. The second punch was inserted and a pressure of 5000 pounds was applied by a hydraulic press to consolidate the beads.

One punch was removed and the assembly placed in a warm air oven at 190° C. for 45 min. The remaining punch served as a support for the filter member during the curing. The resulting filter was firmly bonded to the steel casing at the periphery, forming an integral in-line filter.

EXAMPLE 8

A one inch "Delrin" punch was inserted in a copper sweat fitting similar to that used in Example 2 to form a dam and 10 grams of 100 mesh (149 micron diameter) resin coated glass beads, prepared as in Example 1, charged into the resulting cavity. The assembly was heated to about 110° C. and encased in a latex bag. Pressure was applied to the glass beads by evacuating the latex bag. The latex bag acted as a pressurizable membrane and consolidated the resin coated beads by applying a pressure equal to the ambient atmospheric pressure, about 0.760 m. Hg. The latex bag was removed and the assembly cured at 160° C. for 45 minutes to form an integral in-line filter assembly.

Various modifications and alterations of this invention will become apparent to those skilled in the art without departing from the scope and spirit of this invention, and it should be understood that this invention is not limited to the illustrative embodiments and examples set forth herein.

What is claimed is:

1. An integral in-line filter comprising a housing having a passage therein with a porous body formed in situ therein comprising a porous composite of particulate material dispersed in a cured thermosetting resin matrix, said body being bonded to the wall of said passage.

2. The filter of claim 1 wherein said body comprises thermoset resin-coated glass beads.

3. The filter of claim 2, wherein said body is a laminated structure comprising two or more layers of thermoset resin-coated glass beads having different micronic ratings.

4. The filter of claim 2, wherein said body comprises a shaped, extended surface area filter.

5. The filter of claim 2, wherein said resin is a thermosetting epoxy resin.

6. A method for forming an integral in-line filter comprising inserting in a filter housing a dam conforming to the internal dimensions of said housing, charging a desired amount of thermosetting resin coated particles into the open end of said filter housing, inserting a ram into the open end of said filter housing and applying pressure to consolidate the particles to a desired shape at the desired locus of filtration in said housing, heating the consolidated body to cure said resin thereby bonding said particles together in a resin matrix in the form of a rigid body which is bonded to the inner wall of said filter housing.

7. The method of claim 6, where said resin coated particles are resin coated glass beads.

* * * * *

UNITED STATES PATENT OFFICE
CERTIFICATE OF CORRECTION

Patent No. 3,753,500      Dated August 21, 1973

Inventor(s) Douglas W. Voegeli

It is certified that error appears in the above-identified patent and that said Letters Patent are hereby corrected as shown below:

On the first page of the patent, left-hand column, the filing date of the application (viz., ICIREPAT Number [22]) should read "Mar. 20, 1972".

Column 2, line 44, "member" should read "number".

Signed and sealed this 4th day of June 1974.

(SEAL)
Attest:

EDWARD M. FLETCHER, JR.
Attesting Officer

C. MARSHALL DANN
Commissioner of Patents